United States Patent [19]

Akeel

[11] Patent Number: 4,969,722
[45] Date of Patent: Nov. 13, 1990

[54] DEVICE FOR DELIVERING A COLLIMATED BEAM SUCH AS A LASER BEAM

[75] Inventor: Hadi A. Akeel, Rochester Hills, Mich.

[73] Assignee: GMF Robotics Corporation, Auburn Hills, Mich.

[21] Appl. No.: 324,711

[22] Filed: Mar. 17, 1989

[51] Int. Cl.⁵ .............................................. G02B 26/00
[52] U.S. Cl. .................................. 350/484; 219/121.74
[58] Field of Search ............................. 350/484, 6.91; 219/121.74, 121.79

[56] References Cited

U.S. PATENT DOCUMENTS 3,986,767 10/1976 Rexer et al. .................... 219/121.74

Primary Examiner—Bruce Y. Arnold
Assistant Examiner—Rebecca D. Gass
Attorney, Agent, or Firm—Brooks & Kushman

[57] ABSTRACT

A device for delivering a collimated beam of electromagnetic energy, such as a laser beam, including a focusing lens which is rotatable about a first axis offset from a focal axis of the lens. Rotation of the lens about the first axis causes a laser beam traveling along the first axis to be deflected to travel along a focus beam axis which intersects the focal axis at a focal point which, in turn, traces a curve on the workpiece. The first axis is parallel to the focal axis and is offset a variable first distance therefrom. The lens is also rotatable about a second axis also offset from and parallel to the focal axis. Rotation of the focusing lens about the second axis alters the first distance between the first axis and the focal axis in order to vary the radius of the curve traced on the workpiece. In first and second embodiments of the invention, the focusing lens is supported within a first housing part which is linearly movable with respect to a second housing part along the focal axis to thereby move the focal point relative to the workpiece. In the first embodiment, the first distance between the first axis and the focal axis is variable in discrete amounts. In the second embodiment, a coupling mechanism selectively couples the first and second housing parts together so that a common gear mechanism not only provides rotation of the housing parts about the second axis but also provides linear movement of the first housing part along the focal axis.

20 Claims, 4 Drawing Sheets

DEVICE FOR DELIVERING A COLLIMATED BEAM SUCH AS A LASER BEAM

TECHNICAL FIELD

This invention relates to beam delivery devices and, in particular, to devices for delivering a collimated beam such as a laser beam.

BACKGROUND ART

Laser applications can be divided into several general categories including the measurement of spatial parameters, material heating and/or removal, non-destructive probing of resonant phenomena, communications, optical processing, laser-induced chemical reactions and weapons.

The combination of a laser with a flexible laser beam delivery system which may include a robot allows the laser to operate with a degree of freedom previously unknown. The combination of the two technologies, if successfully performed, is suitable for many material heating and/or removing applications such as cutting glass and trimming plastic or composites. For trimming complex contoured structures, a laser can be coupled with a five axis beam delivery device.

In any such beam delivery device it is important to have smooth device motion with high acceleration. For any specific material to be cut, there is a range of speeds that produce the best finish. Whenever there is a change in direction, the motion system must maintain this speed or cut quality will suffer.

Popular uses for metal-working lasers include seam, spot and fusion welding, cutting, drilling, surface hardening, metal marking, scarfing, deburring, trimming and heat treating. Metal cutting with a laser beam involves focusing the beam at a point on the surface of a workpiece and manipulating the beam to trace the desired cutting path.

NC machines are often used for cutting substantially flat surfaces with a laser beam. The beam path is usually fixed and the object to be cut is fixed to the NC machine table for manipulation in two orthogonal directions.

For cutting circular holes, the NC machine table is usually run at relatively low cutting speeds to maintain the accuracy of a circular pattern equivalent to that of a circular mechanical punch. The relatively large mass and high inertia of NC machine slides does not allow the machine to operate at the high speeds at which laser beam cutting is desired. Running NC machines at the high linear cutting speeds (possible with high power lasers), results in undesirable pattern distortions. Reaction forces from the table drive can induce vibrations in the beam delivery support structure. This will be seen as roughness in the cut. The situation is similar when prior art delivery systems utilizing robots are used to manipulate laser beams though the pattern distortion can be even worse.

One method for overcoming this problem is to use the NC machine or robot only to position the beam at the center point of the desired hole. An end effector of the delivery system offsets the beam focal point at the desired hole radius and then spins the beam itself about the center point of the circle. The focal point traces a circle and effects the desired cut. Higher speeds are attainable by virtue of the relatively low mass and inertia of the parts of the end effector moved in this condition.

An example of such an end effector is illustrated in FIG. 1, wherein four mirrors offset the beam to the desired radius. A linear slide provides adjustment of hole radius either in a programmable or manual fashion.

High quality laser beam cutting usually requires an adaptive focusing device to help maintain the optimum location of the focal point of the beam at the surface of the object being cut. Surface modulations are usually sensed by a variety of commercially available sensors and a control device is commanded to move the focal point towards or away from the surface in accordance with surface modulations. This requires that the beam focusing device or the object be moved as disclosed in U.S. Pat. No. 4,764,655 and U.S. Pat. No. 4,761,534.

Prior art NC machines usually add another axis of control to move the laser head and the focusing device in response to a surface sensor signal. Other prior art utilizes a focusing arrangement by which the focusing lens is moved along the beam center line in response to the surface sensor signal. This is highly desirable since the movable parts are light and can be moved responsively at higher speed than when the hole object, or the laser head, is moved. In combination with a hole cutting arrangement, however, this approach becomes quite complex.

One laser beam delivery system which moves a laser beam to perform an operation on a workpiece includes two mirrors in each joint (i.e. optical joint) of a tubular linkage mechanism which is manipulated by a robot to direct the laser beam along the desired path. A focusing lens positioned in the mechanism concentrates the laser energy and directs it to a singular point with a high power density. However, the robot must be very accurate to direct the beam to a precise area on a workpiece. A longer focal length lens could be used to compensate for robot inaccuracies. However, the resulting beam would be focused over a large area so that both power density and speed are lower.

Elimination of even one mirror from the total number of mirrors in a laser beam delivery system is important for the following reasons: (1) significant cost savings can be realized due to the relatively high cost of the mirrors compared to other components of the system; (2) the efficiency of power transmission is increased since power losses of the collimated laser beam are almost entirely attributed to the absorption of energy which occurs at each mirror; (3) initial alignment of the beam delivery system is simplified with fewer mirrors to align, thereby minimizing the magnitude of the resultant alignment error which is practically achievable; and (4) system reliability is increased and a reduction in required maintenance is achieved with fewer mirrors to clean and maintain in alignment.

The Plankenhorn U.S. Pat. No. 4,539,642 discloses a method of linking a robot with a laser including a laser arm which is manipulated by the robot. The laser arm is supported by the robot arm and is aligned to move in synchronization with the robot joints. The laser arm must be mounted to the robot arm in a precision synchronized fashion.

The Akeel U.S. Pat. No. 4,560,952 discloses a robot laser system including a laser wrist mechanism wherein the robot has a number of degrees of freedom constituted by two orthogonally related linear movements along intersecting longitudinal axes. The wrist has two orthogonally related rotary joints having intersecting pivotal axes.

The Monteith et al U.S. Pat. No. 4,707,585 discloses a laser robot system including a laser wrist.

The Bisiach U.S. Pat. No. 4,677,274 discloses a robot laser system wherein the laser beam reaches the robot through a side opening therein whereafter it is axially directed by a pair of adjustable mirrors to a hollow head.

The Libby U.S. Pat. No. 4,413,180 discloses image acquisition apparatus utilizing a hollow motor shaft through which a light beam enters. The light beam is then reflected by a concave cylindrical reflector to an intercept.

The Marinoni U.S. Pat. No. 4,698,483 discloses a robot laser system wherein the robot includes a base and a fork element supported vertically and rotatably by the base. An arm is articulated at its first end to the fork element about a substantially horizontal axis. A forearm is articulated to a second end of the arm about a substantially horizontal axis. A wrist assembly is mounted at the unarticulated end of the forearm, is rotatable about an axis parallel to the forearm and has an end portion which supports a lens for focusing the laser beam.

The Rando et al U.S. Pat. No. 4,698,479 discloses the use of sealed, sliding telescoping tubes in a laser beam delivery system.

Japanese Patent Document Ser. No. 59-107785 discloses a laser robot system including a robot having a motorized multi-joint arm provided with reflecting mirrors at the ends of the arm part.

Japanese Patent Document No. 59-223188 discloses a laser beam machine having a reflecting mirror provided in each joint portion of a manipulator.

The Rexer et al U.S. Pat. No. 3,986,767 discloses an optical focus device including focus and turning mirrors capable of rotating a laser beam about two orthogonal axes.

DISCLOSURE OF THE INVENTION

An object of the present invention is to provide a device for delivering a collimated beam, such as a laser beam, along a beam path to a workpiece including a relatively simple focusing lens means to allow the generation of a curve on the workpiece at high speeds.

Another object of the present invention is to provide a device for delivering a collimated beam, such as a laser beam, along a beam path to a workpiece including a focusing lens means which is adjustable to trace curves having various radii on the workpiece.

Yet still another object of the present invention is to provide a relatively simply low cost, low weight device for delivering a collimated beam, such as a laser beam, along a beam path to a workpiece including a focusing lens means which is driven by a single gear mechanism to control both focusing and the radii of the curves traced on the workpiece.

In carrying out the above objects and other objects of the present invention, a device for delivering a collimated beam, such as a laser beam, along a beam path to a workpiece is provided. The device includes a rotational first axis, a housing means defining an internal cavity and a focusing lens means received within the internal cavity and intersecting the first axis for focusing the beam. The lens means is rotatably supported on the first axis and has a focal point along a focal axis offset a first distance from the first axis at the lens means. A continuous, unobstructed hollow passage extends along and surrounds the first axis to the lens means so that a beam traveling along the first axis is deflected by the lens means from the first axis to travel along a focused beam axis inclined with respect to the first and focal axes and thence to intersect the focal axis at the focal point. Rotation of the lens means about the first axis causes the focal point to trace a curve on the workpiece.

Preferably, the device is a wrist mechanism and the housing means defines an internal wrist cavity.

Still preferably, the device includes an independent rotational second axis on which the lens means is rotatably supported. Rotation of the lens means about the second axis varies the distance between the first axis and the focal axis.

Also, preferably, the lens means is supported in a first housing part linearly movable relative to a second housing part along the focal axis. In one embodiment of the invention, a gear mechanism in cooperation with coupling means drives the first housing part along the focal axis for controlling the location of the focal point relative to the workpiece. The gear means rotates the first and second housing parts together about the second axis to vary the first distance between the first and focal axes.

The advantages accruing to the device of the present invention are numerous. For example, the device provides a relatively simple beam shifting arrangement that allows generation of a circular hole pattern at high speed. Also, the device provides an adjustable beam shifting mechanism that allows the beam path to be varied in a programmable mode. The device further allows the use of a minimum number of optical devices to offset the beam focal point from an axis of rotation.

The device also provides a relatively simple focusing arrangement in combination with the beam shifting mechanism and utilizes relatively few moving parts. Also, a single drive mechanism may be utilized to control both the focusing and the adjustable beam shifting mechanism. In this way, a low-cost, low-weight adjustable beam shifting and focusing arrangement is provided. The device has particularly utility in cutting operations, such as metal cutting operations wherein circles have to be cut in metal at high speed.

The device is usually associated with control means and feedback sensors that are necessary for the automatic and programmed operation of the device.

Other advantages of the present invention will be readily appreciated as the same become better understood by reference to the following detailed description when considered in connection with the accompanying drawings.

BEST MODE FOR CARRYING OUT THE INVENTION

Figure 1:
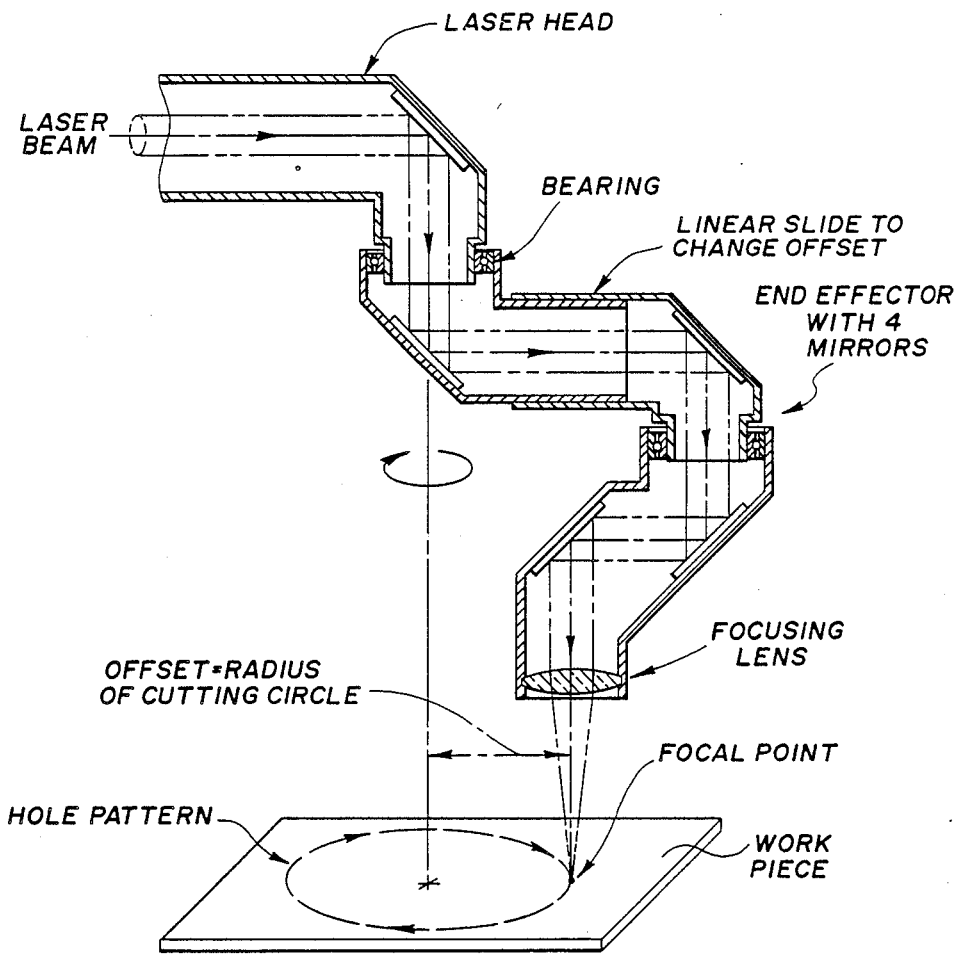
FIG. 1 is a side elevational view of a prior art laser beam delivery device utilized for cutting holes in workpieces.
Figure 2:
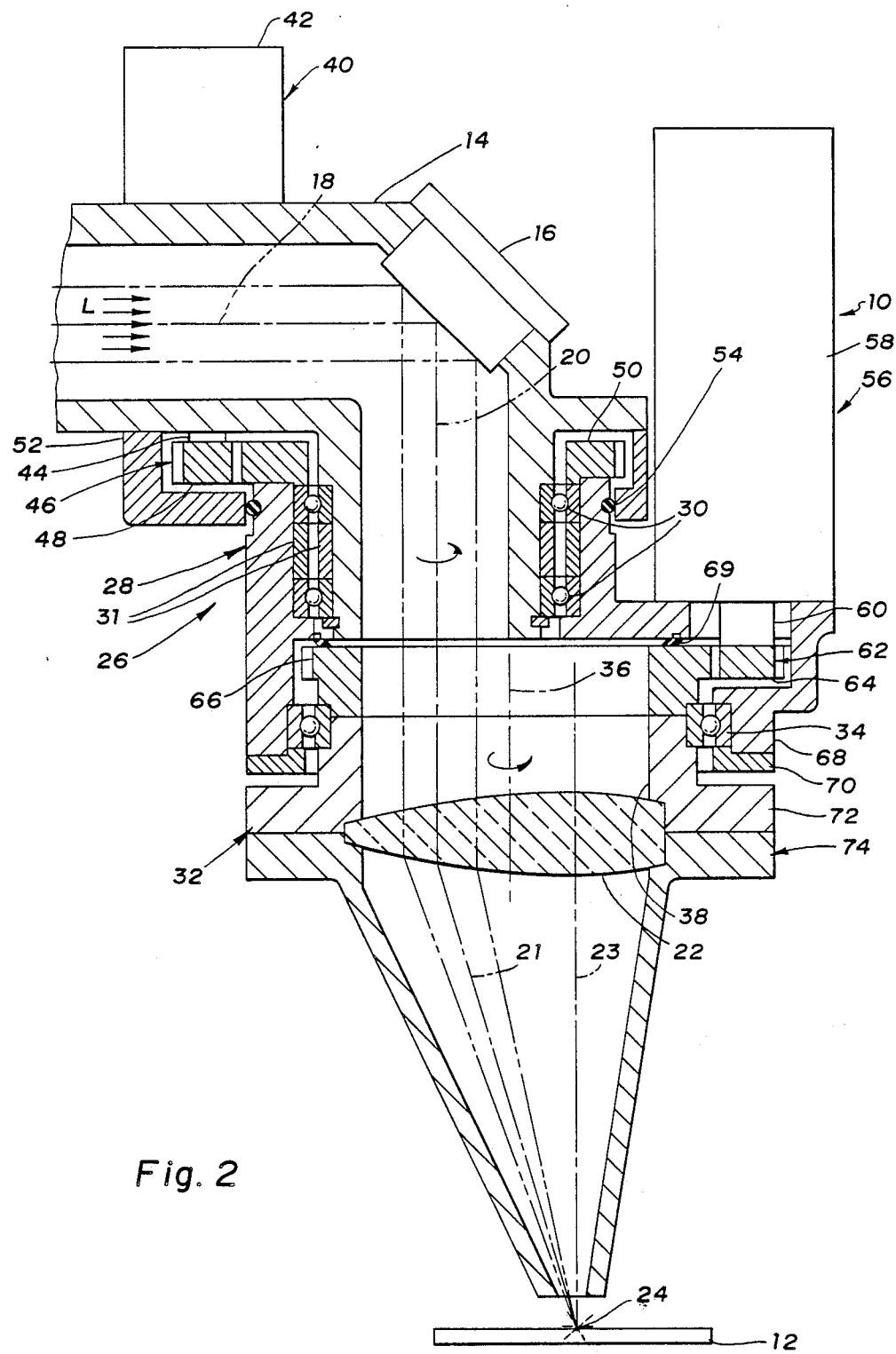
FIG. 2 is a side view, partially broken away and in cross-section of a device for delivering a collimated beam, such as a laser beam, constructed in accordance with the present invention.

Referring now to FIG. 2 of the drawing figures, there is generally indicated at 10, a device for delivering a collimated beam of electro magnetic energy, such as a laser beam, along a beam path to a workpiece or part 12. As illustrated in FIG. 2, the device 10 is mounted for rotational movement on a laser head 14 of a conventional beam delivery system such as a laser robot. A mirror block 16 mounted within the laser head 14 deflects a laser beam passing along a laser head axis 18 to a first axis 20 of the device 10. The deflected beam is then deflected by a partial focusing lens 22 to travel along a focused beam axis 21 and intersects a focal axis 23 of the lens 22 at its focal point 24 to affect cutting or some other laser application on the workpiece 12.

The device 10 includes a housing means or mechanism, generally indicated at 26, which, in turn, includes first and second housing assemblies, generally indicated at 32 and 28, respectively. The second housing assembly 28 is rotatably supported on the laser head 14 by bearings 30 to rotate about the first axis 20. The bearings 30 are spaced apart by spacers 31.

The first housing assembly 32 is rotatably supported on the second housing assembly 28 by a bearing 34 for rotation about a second axis 36 which is located substantially midway between the first axis 20 and the focal axis 23. The first housing assembly 32 receives and retains the lens 22 within an internal cavity 38 for rotation together about the second axis 36. The focal axis 23 is parallel to the first and second axes 20 and 36, respectively.

The second housing assembly 28 is preferably, rotatably driven about the first axis 20 by a drive mechanism, generally indicated at 40. The drive mechanism 40 includes a programmable drive motor 42 having an output shaft 44 which drives a gear mechanism, generally indicated at 46. The gear mechanism 46 includes a first pinion gear 48 in driving engagement with a first drive gear 50 fixedly secured to the second housing assembly 28 so that rotation of the motor shaft 44 and the pinion gear 48 causes the second housing assembly 28 to rotate about the first axis 20.

The motor 42 is mounted on a mounting bracket 52 mounted on the laser head 14 to move therewith. A circular seal 54 is provided between the mounting bracket 52 and the second housing assembly 28 to retain bearing and gear lubricants inside the mounting bracket 52.

The first housing assembly 32 is driven by a second drive mechanism, generally indicated at 56 which includes a second programmable motor 58, having an output drive shaft 60. A second gear means or mechanism, generally indicated at 62, includes a second pinion gear 64 mounted on the output shaft 60. In turn, the pinion gear 64 is in driving engagement with a second drive gear 66 fixedly mounted to the first housing assembly 32 to rotate therewith about the second axis 36.

The motor 58 is supported on the second housing assembly 28 which includes a downwardly depending flange portion 68 for rotatably supporting the first housing assembly 32 on the second housing assembly 28

A bearing retainer 70 is fixedly secured to the flange portion 68 to secure the bearing 34 between the first and second housing assemblies 32 and 28, respectively.

The first housing assembly 32 includes a housing part 72 and a funnel, generally indicated at 74, between which the focusing lens 22 is received and retained so that both the first axis 20 and the second axis 36 intersect the focusing lens 22. As is well known in the art, the funnel 74 also helps to prevent contaminants from entering and collecting on the lower surface of the lens 22, such as during workpiece cutting.

The bearings 30 as well as the bearing 34 are preferably sealed bearings to keep bearing and gear lubricants from escaping into the internal cavity 38. Also, a circular seal 69 is preferably provided between the second housing assembly 28 and the second gear drive 66 to keep the internal cavity 38 fully sealed.

Preferably, only the single bearing 34 is utilized to rotatably support the first housing assembly 32 on the second housing assembly 28. The bearing 34 is of the type conventionally referred to as an X-type that carries moment as well as radial and thrust loads.

The internal cavity 38 above the lens 22 is preferably pressurized with clean air or inert gas to keep the environment clean along the laser beam path and unobstructed. Suspended particles in nonclean air may be heated by the laser beam, thereby reducing efficiency of the device 10.

Figure 3:
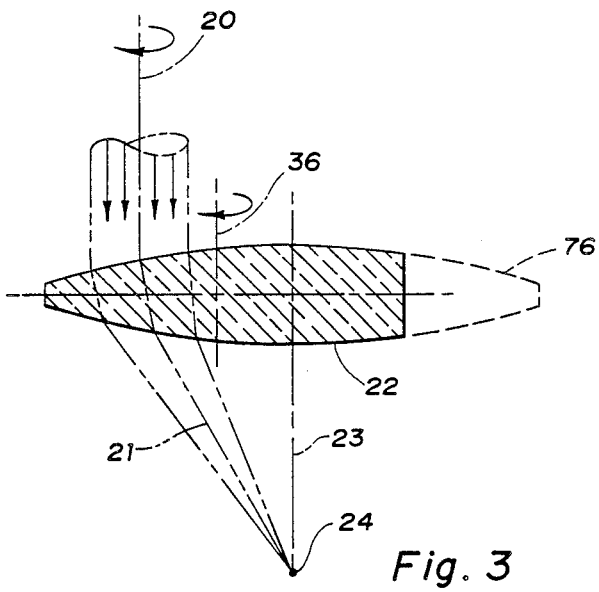
FIG. 3 is a schematic, cross-sectional view illustrating a partial focusing lens of the device, the laser beam and the various rotational, focal and focused beam axes associated therewith.
Figure 4:
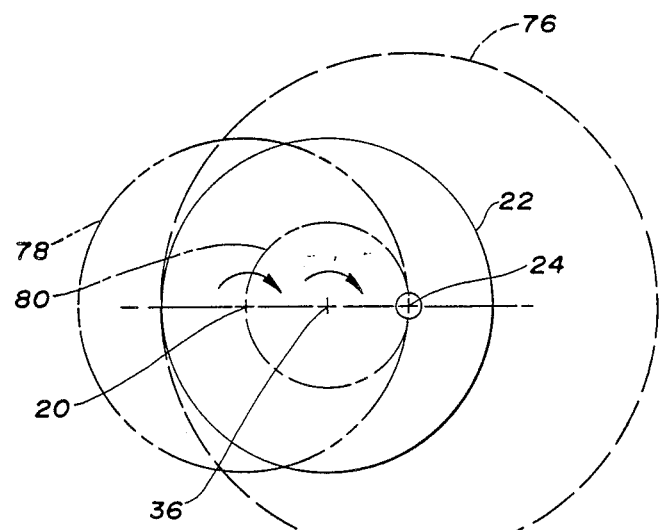
FIG. 4 is a top view of the partial focusing lens of FIG. 3 including a related complete axi-symmetrical lens illustrated by phantom lines and different circles traced by the focal point of the partial focusing lens upon rotation of the partial lens about the first axis.

Referring now to FIGS. 3 and 4, the lens 22 may be a complete axi-symmetrical lens as indicated in phantom by reference numeral 76. However, for compactness, the partial focusing lens 22 is utilized though its optical form is that of a complete axi-symmetrical lens, such as the complete lens 76.

As shown in FIG. 3 the lens 22 encloses the first, second and focal axes 20, 36 and 23, respectively.

By affecting a rotation about the first axis 20 as shown in FIG. 4, the focal point 24 traces a circular path or circle 78 which can affect cutting of a hole having a diameter equal to that of the circle 78.

The motor 58 provides the drive force for rotation about the second axis 36 to move the focal axis 23 along the path of a circle 80. In this way, the focal point 24 located on the focal axis 23 is offset from first axis 20 by a variable distance. The size of the cutting path can thus be varied from zero to the maximum represented by the circle 78.

In like fashion, the motor 42 controls the cutting operation as it drives the entire housing mechanism 26 including the focal point 24 about the first axis 20. The device 10 provides the ability to cut a circle by spinning the focal point 24 of the laser beam along a circle to affect a hole cutting operation.

Figure 5:
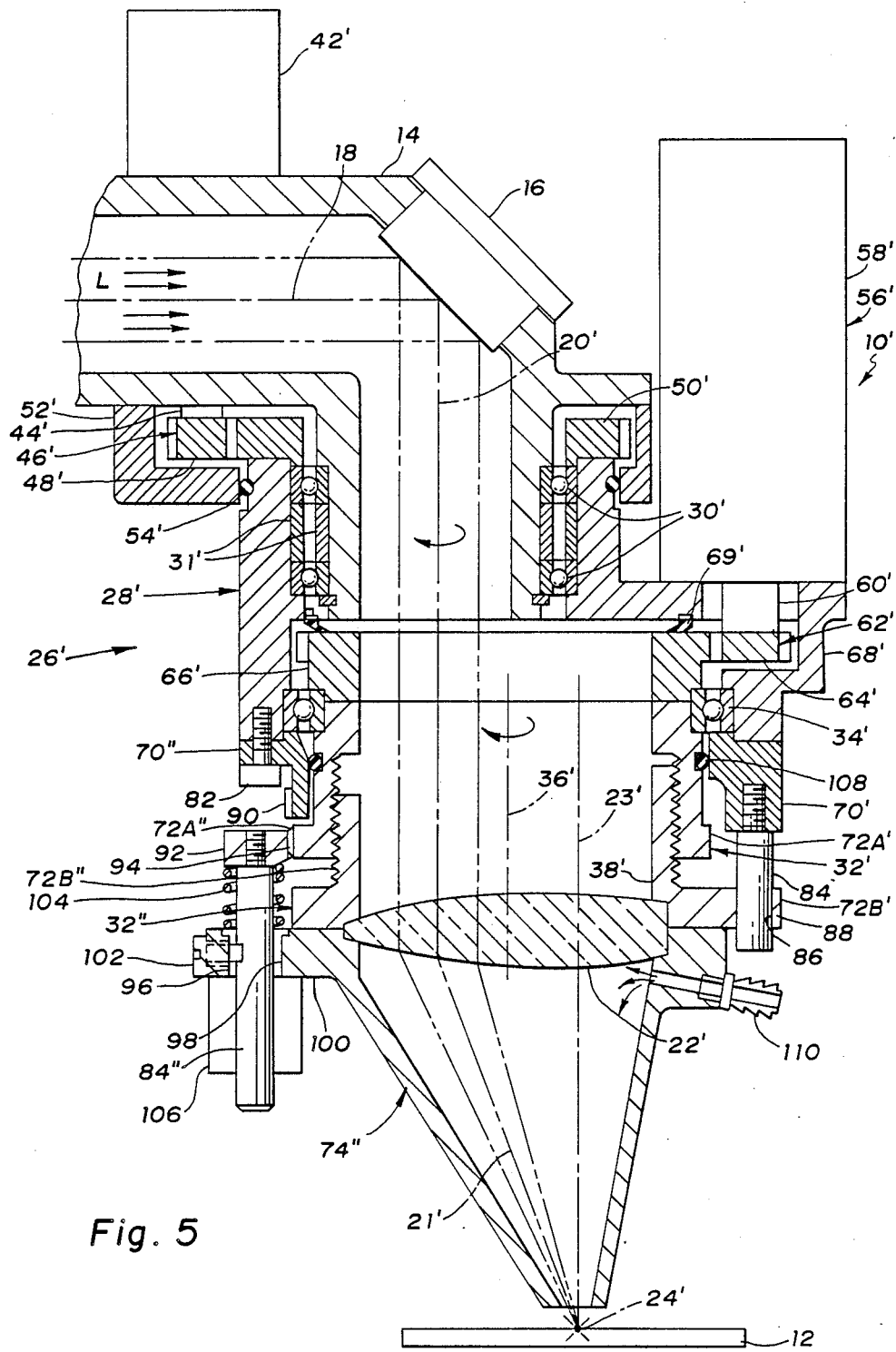
FIG. 5 is a side view, partially broken away and in cross-section, of second and third embodiments of the present invention wherein the righthand side of a lower part of the device illustrates a first mechanism for linearly moving the focusing lens along its focusing axis and the lefthand side of a lower part of the device illustrates a second mechanism for alternately linearly moving the focusing lens or varying the distance between the first axis and the focal axis of the device.

Referring now to FIG. 5, there is illustrated a second device, generally indicated at 10', for delivering a collimated beam, such as a laser beam, to the workpiece 12. Components of the second device 10' which have the same or similar function and/or construction to the first device 10, are given a prime designation. In general, the device 10' of FIG. 5 is different from the device 10 of FIG. 2 in that a focusing means or mechanism is provided for supporting a partial focusing lens 22' within an internal cavity 38' so that the lens 22' can move linearly along its focal axis 23' to thereby move the focal point 24' relative to the workpiece 12.

In the embodiment of FIG. 5, a first housing assembly 32' includes first and second housing parts 72b' and 72a', respectively. The housing parts 72a' and 72b' are threadedly coupled together and are supported for rotation about a first axis 20' by a second housing assembly 28'. In particular, the housing parts 72a' and 72b' are engaged by a mechanical thread of a relatively small pitch.

Two different methods of coupling the housing parts 72a' and 72b' are illustrated in the lower righthand and lower lefthand sides of FIG. 5, respectively. In general, the lower righthand side shows a coupling means or mechanism wherein the hole radius adjustment is done manually and independently of focusing adjustment and the lower lefthand side of FIG. 5 shows a coupling mechanism wherein focusing is done in conjunction with hole radius adjustment in a motorized mode.

Referring now to the lower righthand side of FIG. 5, the device 10' is constructed to allow manual adjustment of the radius of the cutting hole and motorized focusing adjustment. A retainer 70' retains a bearing 34' to permit rotation of the second housing part 72a' about the second axis 36'. The retainer 70' is secured to the second housing assembly 28' by fasteners, such as screws (not shown).

A guide means or mechanism, including a guide pin 84 is threadedly secured to the retainer 70' at one end thereof and is slidably received and retained at its opposite end within a hole 86 formed within a circumferentially extending flange portion of the first housing part 72b'. The flange portion 88 is provided with a plurality of such holes circumferentially spaced around its outer periphery, each of which determines a different location of the focal axis 23' relative to the first axis 20'.

In this arrangement, cutting hole diameter is adjusted manually and in discrete steps by placing the guide pin 84 in different holes along the circumference of the flange portion 88 of the first housing part 72b'. Also, in this arrangement, a motor 58' rotates a gear 66' which rotates the second housing part 72a' which, in turn, forces the first housing part 72b' to slide linearly along the focal axis 23' by virtue of the linear guiding arrangement of the guide pin 84 in the flange portion 88. This movement causes a change in the location of the focal point 24' along the focal axis 23'. In this way, the motor 58' acts as a focusing control motor. Although not shown, it is customary that a height sensor is attached to the device 10 which detects the shift of the focal point from its desired location and provides the necessary signal for the focusing control motor to operate.

Referring now to the lower lefthand side of FIG. 5, there is illustrated in general, an arrangement whereby the cutting hole size as well as focusing can be adjusted by the motor 58' by utilizing a different coupling means or mechanisms which is movable between first and second operating states.

In the embodiment of the lower lefthand side of FIG. 5, a retainer 70" has a plurality serrated teeth 90 formed along its circumference and is connected to a second housing assembly 28" by screws 82. A coupler 92 also has serrated teeth which are alternately in driving engagement with the teeth 90 of the retainer 70" or in driving engagement with second teeth 94 formed on the outer circumferential surface of a second housing part 72a", as is described in greater detail hereinbelow.

The coupler 92 is threadedly secured at one end of a guide pin 84". The guide pin 84" is slidably guided within a bushing 96 which, in turn, is located within an aperture 98 formed in an outer circumferential flange 100 of a funnel, generally indicated at 74".

One end of a screw 102 is disposed within an elongated groove formed in the guide pin 84" which permits sliding movement of the guide pin 84" within the bushing 96 but prevents rotation of the guide pin 84" within the bushing 96.

A spring 104 provides a biasing force to push the coupler 92 and, consequently, the guide pin 84" towards the retainer 70".

An actuator, such as a solenoid 106, is provided so that when the solenoid 106 is energized the guide pin 84" moves downwardly against the biasing action of the spring 104 so that the teeth of the coupler 92 engage the teeth 94 of the second housing part 72a" rather than the teeth 90 of the retainer 70", as shown in FIG. 5.

In this way, the housing parts 72a" and 72b" are coupled together through the guide pin 74" and the funnel flange 100 and can move together as a rigid body to thereby rotate together about the second axis 36' upon actuation of the motor 58', thereby adjusting cutting hole radius.

When the actuator 106 is deenergized, the spring 104 pushes the coupler 92 upwardly so that the teeth of the coupler 92 engage the teeth 90 of the retainer 70" to provide an arrangement similar to that described for the lower righthand side of FIG. 5 wherein the first housing part 72b" and the retainer 70" are coupled together to allow linear movement of the first housing part 72b" relative to the second housing part 72a" along the focal axis 23'.

In the embodiment of FIG. 5, a third seal 108 is provided between either one of the retainers 70' and 70" and its respective second housing part 72a' or 72a" to retain bearing and gear lubricants.

Also, in addition to the structure illustrated in FIG. 2, the funnel 74" is provided with a fixture 110 to permit the introduction of cooling air to keep the lens 22' from overheating. Oxygen may be substituted for the cooling air and may be placed under pressure so that the pressurized oxygen is forced out of the tip of the funnel 74" to assist the laser cutting process and keep debris from entering the funnel 74' which may contaminate the lens 22'.

The device 10' provides numerous advantages. For example, the device 10' provides a relatively low-cost, low-weight focusing adjustment in combination with radius adjustment for a laser hole cutting. Also, the beam focusing adjustment is relatively simple and utilizes relatively few moving parts. Finally, a single drive gear is utilized to control both focusing and radius change mechanisms.

While the best mode for carrying out the invention has herein been described in detail, those skilled in the art to which this invention relates will recognize various alternative designs and embodiments for practicing the present invention as defined by the following claims.

What is claimed is:

1. A device for delivering a collimated beam along a beam path to a workpiece, the device comprising:
   a rotational first axis;
   housing means defining an internal cavity;
   focusing lens means received within the internal cavity and intersecting said rotational first axis for focusing the collimated beam, said lens means being rotatably supported on said rotational first axis, said lens means having a focal point along a focal axis offset a first distance from said rotational first axis at said lens means; and a continuous unobstructed hollow passage that extends along and surrounds said rotational first axis to said lens means so that a beam traveling along said rotational first axis is deflected by said lens means from said rotational first axis to travel along a focused beam axis inclined with respect to said rotational first and focal axes and thence to intersect said rotational first and focal axes and thence to intersect the focal axis at the focal point; wherein rotation of said lens means about said rotational first axis causes the focal point to trace a curve on the workpiece.

2. A device for delivering a collimated beam along a beam path to a workpiece, the mechanism comprising:
a rotational first axis;
housing means defining an internal wrist cavity;
focusing lens means received within the wrist cavity and intersecting said rotational first axis for focusing the collimated beam, said lens means being rotatably supported on said rotational first axis, said lens means having a focal point along a focal axis offset a first distance from said rotational first axis at said lens means; and a continuous unobstructed hollow passage that extends along and surrounds said rotational first axis to said lens means so that a beam traveling along said rotational first axis is deflected by said lens means from said rotational first axis to travel along a focused beam axis inclined with respect to said rotational first and focal axes and thence to intersect the focal axis at the focal point; wherein rotation of said lens means about said rotational first axis causes the focal point to trace a curve on a workpiece.

3. The device as claimed in claim 1 or claim 2 wherein said rotational first axis is parallel to the focal axis so that every point on the curve is located the first distance from a center point located on said rotational first axis.

4. The device as claimed in claim 1 or claim 2 wherein said lens means is supported within the internal cavity for linear movement along the focal axis.

5. The device as claimed in claim 4 wherein the housing means includes first and second housing assemblies, the second housing assembly being rotatably supported about said rotational first axis and supporting the first housing assembly, the first housing assembly supporting said focusing lens means for linear movement along the focal axis relative to the second housing assembly to thereby move the focal point relative to the workpiece.

6. The device as claimed in claim 1 or claim 2 further comprising varying means for varying the first distance between said rotational first and focal axes.

7. The device as claimed in claim 6 wherein said varying means varies the first distance in discrete amounts.

8. A device for delivering a collimated beam along a beam path to a workpiece, the device comprising:
independent rotational first and second axes;
housing means defining an internal cavity;
focusing lens means received within the internal cavity and intersecting said rotational first axis for focusing the collimated beam, said lens means being rotatably supported on said rotational first and second axes, said lens means having a focal point along a focal axis offset a first distance from said rotational first axis at said lens means; and
a continuous unobstructed hollow passage that extends along and surrounds said rotational first axis to said lens means so that a beam traveling along said rotational first axis is deflected by said lens means from said rotational first axis to travel along a focused beam axis inclined with respect to said rotational first and focal axes to intersect the focal axis at the focal point; wherein rotation of said lens means about said rotational first axis causes the focal point to trace a curve on the workpiece and wherein rotation of said lens means about said rotational second axis varies the first distance.

9. The device as claimed in claim 8 wherein said rotational first axis is parallel to the focal axis, every point on the curve being located the first distance from a center point on said rotational first axis.

10. The device as claimed in claim 8 wherein said rotational second axis is parallel to said rotational first and focal axes and intersects said lens means at the midpoint between said rotational first and focal axes.

11. The device as claimed in claim 8 wherein the collimated beam is a collimated optical beam and said lens means includes an optical axi-symmetrical lens.

12. The device as claimed in claim 11 wherein the optical axi-symmetrical lens is a partial lens.

13. The device as claimed in claim 8 wherein said lens means is a single axi-symmetrical lens.

14. The device as claimed in claim 13 wherein the single axi-symmetrical lens is a partial lens.

15. The device as claimed in claim 8 wherein said focusing lens means is supported within the internal cavity for linear movement along the focal axis.

16. The device as claimed in claim 15 wherein the housing means includes first and second housing assemblies, said second housing assembly being rotatably supported about said rotational first axis and said first housing assembly being rotatably supported about said rotational second axis by the second housing assembly, the first housing assembly including first and second housing parts, said lens means being supported by the first housing part for linear movement along the focal axis relative to the second housing part to move the focal point relative to the workpiece.

17. The device as claimed in claim 16 further comprising gear means for providing independent rotation of the second housing part about said rotational second axis and said second housing assembly about said rotational first axis, the second housing part, in turn, linearly driving the first housing part along the focal axis for controlling the location of the focal point relative to the workpiece.

18. The device as claimed in claim 17 further comprising coupling means for coupling the second housing assembly and the first housing part together in a first operative state wherein the first housing part is threadedly mounted on the second housing part and wherein the coupling means allows the drive mechanism to rotate the second housing part relative to the first housing part.

19. The device as claimed in claim 18 wherein the coupling means includes a guide mechanism mounted on the second housing assembly and extending towards the first housing part to guide movement of the first housing part along the focal axis.

20. The device as claimed in claim 18 or claim 19 wherein the coupling means selectively couples the first and second housing parts together in a second operative state to prevent said relative linear movement and so that the gear means rotates the first and second housing parts together with said lens means about said rotational second axis to vary the first distance between said rotational first and focal axes.

* * * * *